US006267049B1

(12) United States Patent
Silvano

(10) Patent No.: US 6,267,049 B1
(45) Date of Patent: Jul. 31, 2001

(54) APPARATUS TO PRODUCE ICE-CREAM

(75) Inventor: PozzoBon Silvano, Trevignano (IT)

(73) Assignee: Simac-Vetrella SpA, Cazzago di Pianiga (IT)

( * ) Notice: Subject to any disclaimer, the term of this patent is extended or adjusted under 35 U.S.C. 154(b) by 0 days.

(21) Appl. No.: 09/719,349

(22) PCT Filed: Jun. 9, 1999

(86) PCT No.: PCT/IB99/01063

§ 371 Date: Dec. 12, 2000

§ 102(e) Date: Dec. 12, 2000

(87) PCT Pub. No.: WO99/63839

PCT Pub. Date: Dec. 16, 1999

(30) Foreign Application Priority Data

Jun. 12, 1998 (IT) .............................. UD980032 U
Jul. 10, 1998 (IT) .............................. UD98A0121

(51) Int. Cl.⁷ .............................. A23L 1/00; A23G 9/00; B01F 7/00; B01F 7/16
(52) U.S. Cl. .............................. 99/455; 99/348; 99/452; 62/342; 366/144; 366/149; 366/314
(58) Field of Search .............................. 99/348, 452–455, 99/456, 459, 483, 517; 366/144–149, 314, 601, 309; 62/342, 343, 518, 354, 306, 308, 136; 165/169, 136

(56) References Cited

U.S. PATENT DOCUMENTS

| | | | | |
|---|---|---|---|---|
| 4,070,957 | * | 1/1978 | Korekawa et al. | 99/455 |
| 4,392,361 | * | 7/1983 | Calvalli | 366/309 |
| 4,535,604 | * | 8/1985 | Cavalli | 62/342 |
| 4,573,329 | * | 3/1986 | Cavalli | 366/149 X |
| 4,664,529 | * | 5/1987 | Cavalli | 366/144 X |
| 4,708,489 | * | 11/1987 | Carlson | 366/149 |
| 4,716,822 | * | 1/1988 | O'Brien | 99/455 |
| 4,974,965 | * | 12/1990 | Heinhold et al. | 99/455 X |
| 5,076,153 | * | 12/1991 | Takahashi et al. | 99/327 |
| 5,351,606 | * | 10/1994 | Matsuzaki | 99/348 |
| 5,363,746 | * | 11/1994 | Gordon | 99/328 |
| 5,433,139 | * | 7/1995 | Kitagawa et al. | 99/327 |
| 5,549,042 | * | 8/1996 | Bukoschek et al. | 62/342 X |

* cited by examiner

Primary Examiner—Timothy F. Simone
(74) Attorney, Agent, or Firm—Antonelli, Terry, Stout & Kraus, LLP

(57) ABSTRACT

Apparatus to produce ice-cream or similar cold products, comprising a cooling container, a cooling device arranged around the cooling chamber and an ice-cream making receptacle, inside the receptacle there being included a rotating whisk associated with a driven shaft, the cooling device comprising a vertical aperture, the cooling device being able to selectively assume a first widened position, or a second closed position, there being included an opening device to cooperate with the cooling device to take them selectively from the second to the first positions.

18 Claims, 3 Drawing Sheets

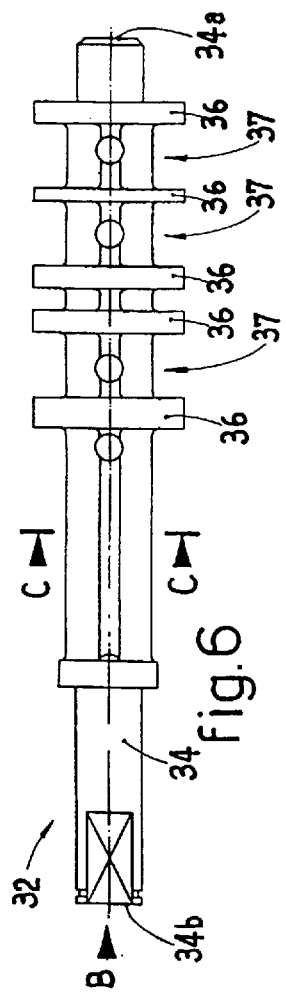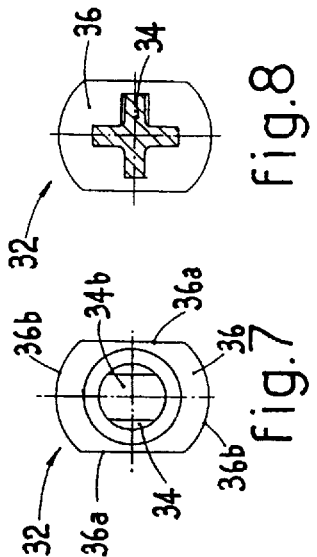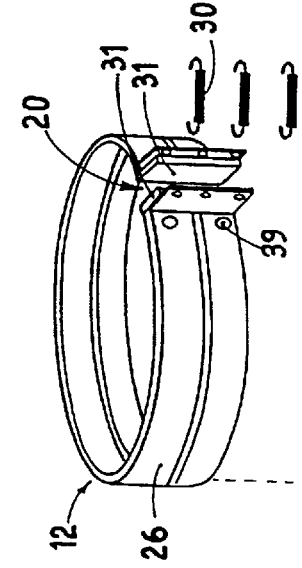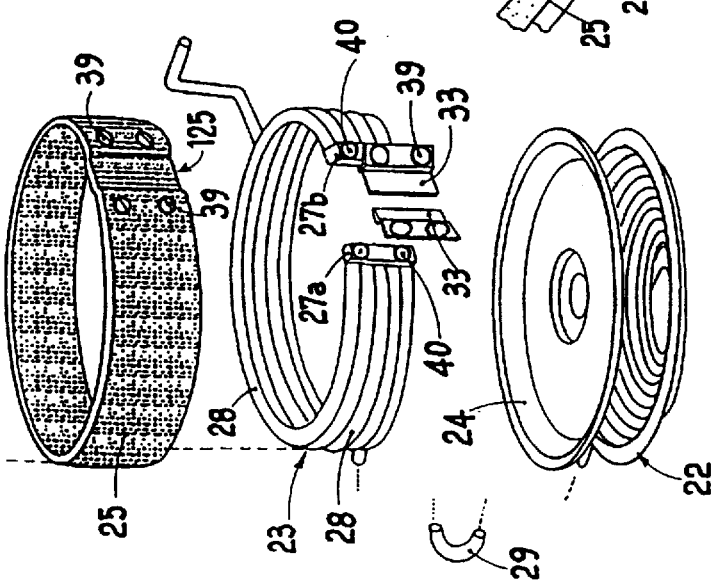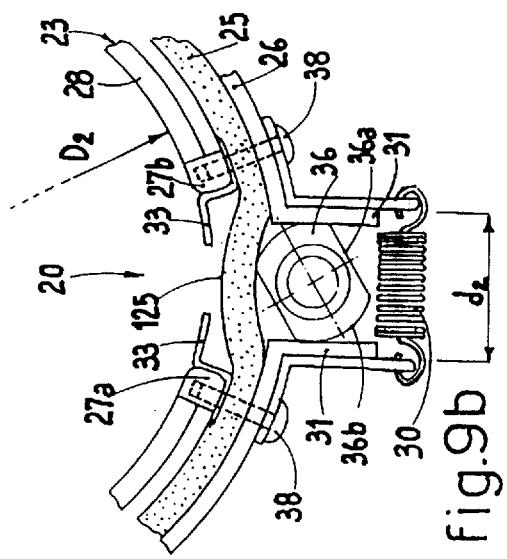

APPARATUS TO PRODUCE ICE-CREAM

FIELD OF THE INVENTION

This invention concerns an apparatus to produce ice-cream as set forth in the main claim.

The apparatus according to the invention is the type with an ice-cream making receptacle which can be inserted into and removed from a cooling chamber.

The apparatus is suitable to be used particularly, but not exclusively, in the domestic field to prepare ice-cream or other cold food products such as "sorbets", crushed-ice fruit-drinks or otherwise.

BACKGROUND OF THE INVENTION

The state of the art includes devices used in the domestic field to prepare ice-cream, crushed-ice fruit-drinks, "sorbets" and other similar cold products, including an ice-cream making receptacle suitable to be temporarily positioned inside a cooling chamber.

The desired ingredients are poured into the receptacle, which is cooled from outside; the ingredients are mixed and amalgamated together by a rotary whisk mounted on a shaft arranged substantially axially with respect to the receptacle.

In this type of device, since the ice-cream making receptacle can be removed, it is possible to obtain various advantages, including that of facilitating and accelerating both the collection of the ice-cream produced and the cleaning operations.

However, the fact that the ice-cream making receptacle can be removed also entails some technical problems which make the apparatus in its entirety more complex, and therefore more costly.

The state of the art includes an apparatus equipped with a a conical ice-cream making receptacle suitable to be inserted, thanks to the mating shape, into a mating conical cooling chamber defined by cooling conduits coiled substantially in a spiral.

This embodiment does not give high productivity inasmuch as it is extremely difficult to achieve a precise coupling of the cooling conduits of the cooling chamber and the removable receptacle.

The state of the art also includes an apparatus wherein the cooling chamber is defined by a receptacle suitable contain a liquid, for example brine, inside which a cooling circuit is immersed.

If on the one hand this embodiment allows to obtain great therma efficiency with repect to the previous embodiment, on the other hand it has considerable constructional complicantions apart from being very inconvenient to use.

Another disadvantage of devices known in the state of the art is that the whisks used co-operating with the aforesaid receptacles perform a satisfactory mixing of the ice-cream only in the central area of the receptacle, but they are not able to clean the bottom and inside wall.

Thus encrustations are formed which give a non-homogenous final product and limit the cooling exchange, which consequently increase the processing times.

Moreover, the mixing and amalgamation of all the ingredients is unsatisfactory.

U.S. Pat. No. 4,392,361 disclose a self-contained apparatus for making an ice cream type mixture having a mixer chamber which is cooled by a refrigerator unit and a flexible blade which is rotatably mounted in the container.

U.S. Pat. No. 4,535,604 and U.S. Pat. No. 4,573,329 disclose ice cream making machines each having an ice-cream making vassel which can be inserted in and removed from a cylindrical cooling chamber, wherein cam elements of circular from are provided for selectively enlarging the cooling chamber.

The present Applicant has designed and ambodied this invention to overcome these shortcomings and to obtain further advantages.

SUMMARY OF THE INVENTION

The invention is set forth and characterised in the main claim, while the dependent claims describe other characteristics of the idea of the main embodiment.

The purpose of the invention is to achieve an apparatus to produce ice-cream wherein the ice-cream making receptacle an easily be extracted, yet at the same time the thermal efficiency is maintained.

Another purpose of the invention is to facilitate the operations to extract the ice-cream making receptacle using an extremely simple, economical and functional embodiment.

A further purpose is to reduce the possibilities of break-downs and malfunctioning of the mechanical parts involved in these operations to remove the ice-cream making receptacle.

Another purpose is to achieve an apparatus to produce ice-cream wherein the whisk co-operates with the ice-cream making receptacle in such a manner as to achieve a homogeneous mixing of the ingredients of the ice-cream and to give the ice-cream the proper qualities of softness and creaminess.

The apparatus according to the invention comprises a substantially cylindrical cooling chamber, not completely closed due to the presence of a vertical aperture.

According to one characteristic of the invention, the cooling chamber is at least partly elastic and co-operates with opening means suitable to temporarily widen the vertical aperture and thus the cooling chamber itself, to allow the ice-cream making receptacle to be inserted or removed.

When the opening means are inactive, the cooling chamber tends to elastically assume a closed position suitable to hold the ice-cream making receptacle inside itself, for example when the apparatus is being used.

According to another characteristic of the invention, moreover, the cooling chamber co-operates externally with at least a layer of elastically yielding and thermally insulated material, suitable to prevent cooling losses towards the outside.

The ice-cream making receptacle comprises a hole, in a substantially central position, inside which the driven shaft which is associated with the whisk passes.

The whisk comprises a central coupling element suitable to co-operate with the driven shaft, with which at least two blades are associated, arranged diametrically opposite the coupling element.

In a preferential form of embodiment, the blades are made of an at least partly flexible material, and lie on a plane angled with respect to the plane defined by the bottom of the cooling container.

According to the invention, a first blade is substantially L-shaped, with a first side co-operating with the bottom of the ice-cream making receptacle and a second side facing upwards and suitable to co-operate with the side wall of the receptacle.

A second blade is substantially pointed and has a slightly convex surface with the convexity facing the bottom of the cooling container.

The second blade comprises an outer profile suitable to co-operate with the side wall of the cooling container and a curved profile facing the bottom of the cooling container.

As the whisk rotates, the first blade scrapes the bottom and the side wall of the ice-cream making receptacle, cleaning these surfaces and conveying the mixture towards the central zone of the container.

At the same time the second blade pushes and crushes the mixture from the central zone of the receptacle towards the side wall and the bottom.

The mixture, compressed by the second blade, is subjected to a softening action which is more efficacious due to the curved profile of the second blade.

The curved profile defines, with the bottom of the ice-cream making receptacle, an aperture through which the mixture flows before being raised again in order to be compressed again.

The combined action of the two blades, therefore, not only prevents encrustations from forming on the side wall and on the bottom of the cooling container; it also mixes the ingredients homogeneously and amalgamates the ingredients perfectly and whisks the ice-cream in an optimum manner, making it extremely soft and creamy.

The processing times are also considerably reduced, which saves a considerable amount of energy and makes the ice-cream maker more productive.

BRIEF DESCRIPTION OF THE DRAWINGS

These and other characteristics of the invention will become clear from the following description of a preferential form of embodiment, with reference to the attached drawings wherein:

FIG. 5 is an exploded view of the cooling chamber of the apparatus according to the invention;

FIG. 6 shows the enlarged detail A of FIG. 4;

FIG. 7 shows a view from B of FIG. 6;

FIG. 8 shows the section from C to C of FIG. 6;

FIGS. 9a and 9b show a view from above of two different operating positions of the opening means according to the invention;

FIG. 11b shows a variant of FIG. 11a.

DETAILED DESCRIPTION OF A PREFERRED EMBODIMENT

Figure 1:
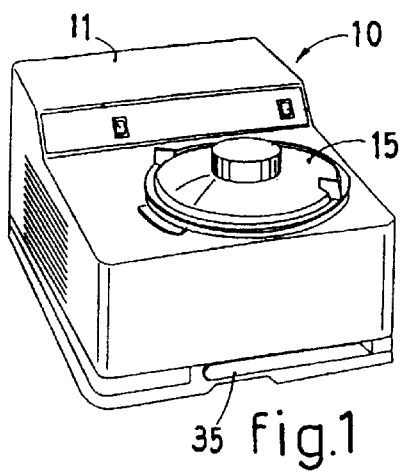
FIG. 1 shows an apparatus to produce ice-cream, with a removable ice-cream making receptacle according to the invention.

With reference to the attached Figures, an apparatus 10 to produce ice-cream according to the invention comprises a box-like structure 11 containing a substantially cylindrical cooling chamber 12, in which an ice-cream making receptacle 13 is suitable to be inserted; the receptacle can be closed at the top by a lid 15 and a whisk 14 is suitable to rotate inside.

The box-like structure 11 also contains a cooling unit to cool the chamber 12 and motor organs to drive the whisk 14, which are of a known type and therefore not shown in the drawings.

Figure 4:
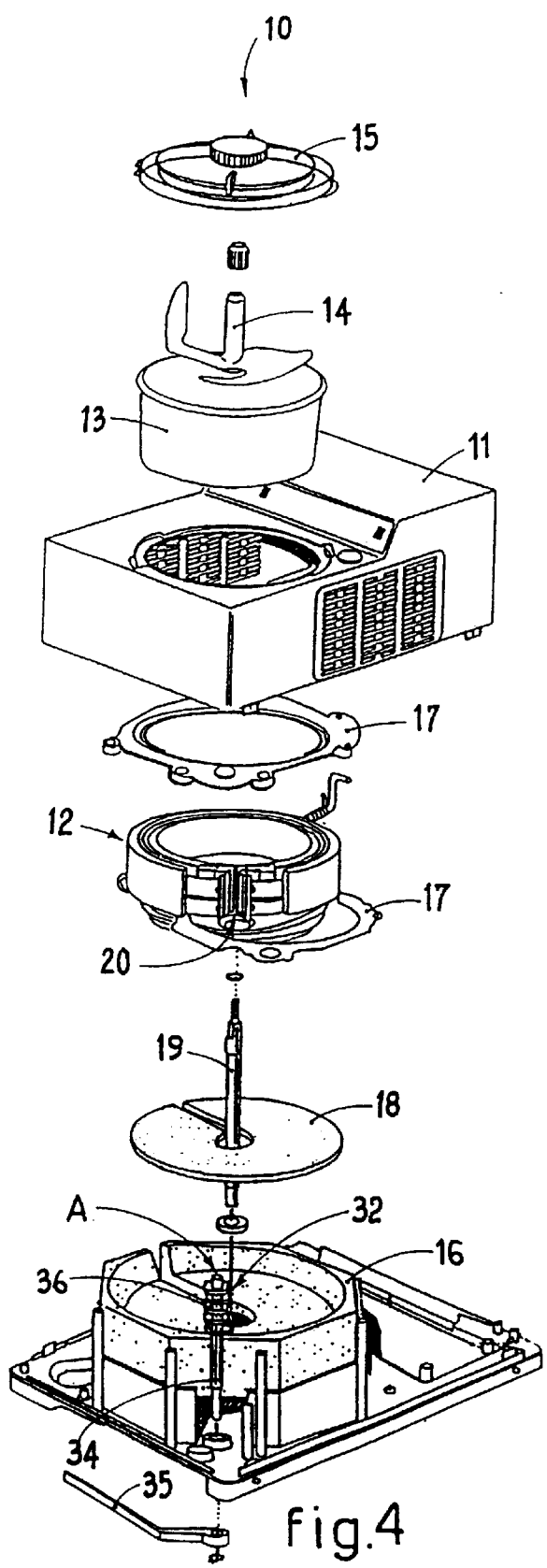
FIG. 4 is a part and exploded view of the apparatus shown in FIG. 1.
Figure 10:
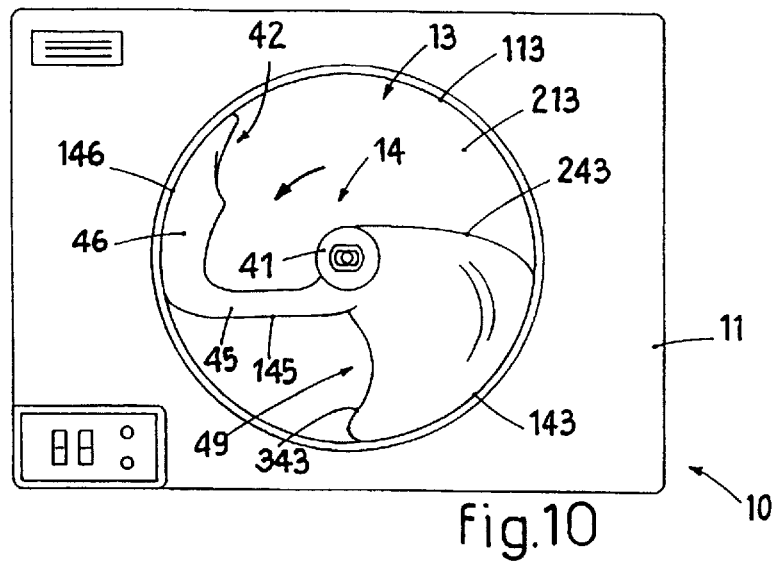
FIG. 10 shows from above the apparatus according to the invention with the whisk inserted in the ice-cream making receptacle.

The cooling chamber 12 (FIG. 4) is associated with the box-like structure 11 by means of flanges 17 and rests on a shock-absorber disk 18 and a bottom 16, each made of insulating material.

Coaxial to the cooling chamber 12, the box-like structure 11 supports a shaft 19 to drive the whisk 14.

According to one characteristic of the invention, the cooling chamber 12 has a vertical aperture 20 (FIG. 5) which makes it at least partly elastic.

An opening element 32 (FIG. 9) co-operates with the vertical aperture 20, and will be described in more detail hereafter.

As shown in the exploded drawing in FIG. 5, the cooling chamber 12 comprises a first cooling coil 22 a second cooling coil 23, a plate 24, an annular element 25 and an outer band 26.

The first coil 22 defines the bottom of the cooling chamber 12 and is made with a pipe for the circulation of the cooling fluid, wound substantially in a spiral and in such a manner as to define inside a volume suitable to house a plate 24 on which the bottom of the ice-cream making receptacle 13 rests when it is inserted into the cooling chamber 12.

The second coil 23 defines the inner side wall of the cooling chamber 12 and is made with segments 28 of the pipe for the circulation of cooling fluid, shaped like the arc of a circle with an equal radius of curvature and arranged one on the other, substantially in contact.

The superimposed ends of the segments 28 are associated with each other by means of two collector elements, respectively 27a and 27b, suitable to achieve a desired circuit for the circulation of the cooling fluid and laterally delimiting the vertical aperture 20.

Respective shaped plates 33 are associated with the collector elements 27a and 27b, and extend towards one another so as to partly close the vertical aperture 20.

The shaped plates 33 allow to make the inner circumference of the second coil 23 substantially continuous, both to allow the heat exchange between the ice-cream making receptacle 13 and the second coil 23 in correspondence with the vertical aperture 20, and also to prevent interference between the annular element 25 and the ice-cream making receptacle 13 when the latter is inserted.

The first 22 and second 23 coils are connected by means of a segment of pipe 29.

The outer band 26 defines an open ring in correspondence with the vertical aperture 20, outside and coaxial with the second coil 23.

The ends of the outer band 26 are associated with each other by means of three helical springs 30.

To be more exact, the ends are bent outwards so as to define respective, substantially parallel fins 31, between which the opening element 32 is suitable to be positioned.

The springs 30 are of the extension type; their function is to bring the fins 31 together in order to close the open ring defined by the outer band 26.

The annular element 25 is made of heat insulating material, for example rubber, and is positioned between the outer band 26 and the second coil 23 in order to prevent cooling loss towards the outside of the cooling chamber 12.

In correspondence with the vertical aperture 20 the annular element 25 is not interrupted, but has a shaped segment 125 suitable to allow the aperture 20 to widen.

According to the invention, the outer band 26, the annular element 25, the second coil 23 and the shaped plates 33 are associated with each other by means of ordinary screws 38 (FIGS. 9a and 9b) which are inserted into through holes 39 (FIG. 5) made on the elements 26, 25 and 33 and screwed into threaded holes 40 on the collector elements 27a and 27b of the second coil 23.

According to the invention, the opening element 32 (FIGS. 6+9) consists of a vertical shaft 34, rotatably associated, in correspondence with its upper 34a and lower 34b ends, with the box-like structure 11.

Figure 2:
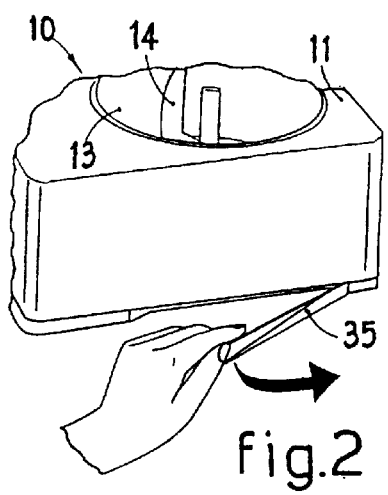
FIG. 2 is a detail of FIG. 1.
Figure 3:
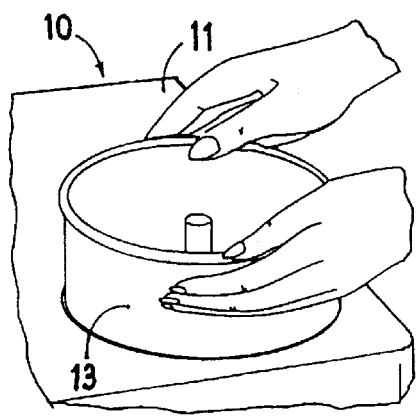
FIG. 3 is another detail of FIG. 1.

At the lower end 34b of the vertical shaft 34 a command lever 35 is solidly associated, accessible for the user from outside the box-like structure 11 (FIG. 2).

In defined positions between the upper 34a (FIG. 6) and lower 34b ends, the command shaft 34 is equipped with a plurality of cam elements 36, in this case five; between the adjacent cam elements 36 a space 37 is defined to partly house the springs 30.

Every cam element 36 has a perimeter defined by two plane sides 36a (FIG. 7) opposite each other and parallel, connected by two curved sides 36b, outwardly convex, also opposite each other.

In this case the command shaft 34 is produced by means of die-casting, to reduce costs, and the intermediate section is shaped like a cross (FIG. 8).

The apparatus 10 according to the invention functions as follows:

Normally, the command lever 35 is in a closed position (FIG. 1) and the command shaft 34 associated therewith assumes an inactive position as shown in FIG. 9a.

In this position, the cam elements 36 are substantially in axis with the cooling chamber 12, that is to say, they have their plane sides 36a substantially parallel to the fins 31 of the outer band 26.

In this case, both the plane sides 36a of the cam elements 36 rest on the respective inner surface of the fins 31 but obviously the plane sides 36a may also be distanced from the said inner surface.

When the command shaft 34 is in the inactive position, the two fins 31 are at a distance "d1", substantially equal to or slightly greater than the distance between the plane sides 36a.

In the inactive position therefore, the second coil 23 is in a non-widened position and has a diameter "D1" which allows the coil 23 to press slightly on the ice-cream making receptacle 13 and clamp it.

By displacing the command lever 35 at an angle towards the outside (FIG. 2), it is possible to take the coil 23 to a widened position to allow the ice-cream making receptacle 13 to be removed and inserted.

This entails the rotation through 50°, in an anti-lockwise direction (FIG. 9b), of the command shaft 34 and therefore of the cam elements 36, which take their curved sides 36b to co-operate with the inner surface of the fins 31, and take the latter to a reciprocal distance "d2" which is greater than "d1".

For the second coil 23, this entails an increase in the inner diameter from the value "D1" to the value "D2".

In this way, between the coil 23 and the ice-cream making receptacle 13 a space is formed which allows the receptacle 13 to be removed or inserted.

The ice-cream making receptacle 13, in fact, has an outer diameter of a value between the inner diameter "D1" of the coil 23 when in its non-widened position (FIG. 9a) and the inner diameter "D2" of the coil 23 when in its widened position (FIG. 9b).

Inside the ice-cream making receptacle 13 as described above the whisk 14 is suitable to be made to rotate; it comprises a central element 41, hollow inside, suitable to couple with the shaft 19 by means of a threaded knob 44.

The whisk 14 also comprises two blades, first 42 and second 43, made as a single piece with the element 41 and arranged diametrically opposite thereto.

The two blades 42 and 43 are suitable to co-operate with the bottom 213 and the cylindrical side wall 113 of the refrigerated receptacle 13.

Figure 11A:
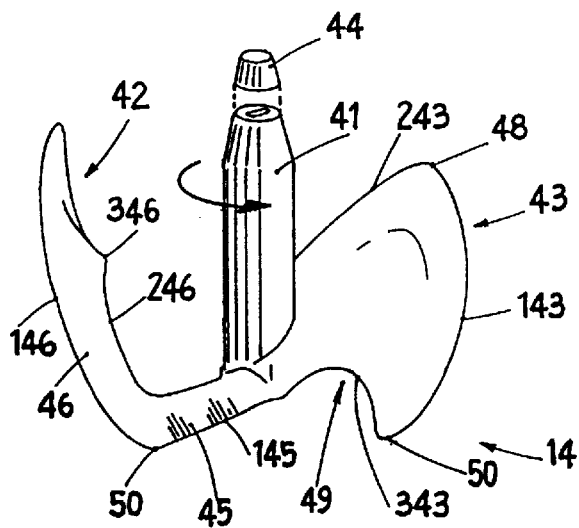
FIG. 11a shows a first form of embodiment of the whisk.
Figure 11B:
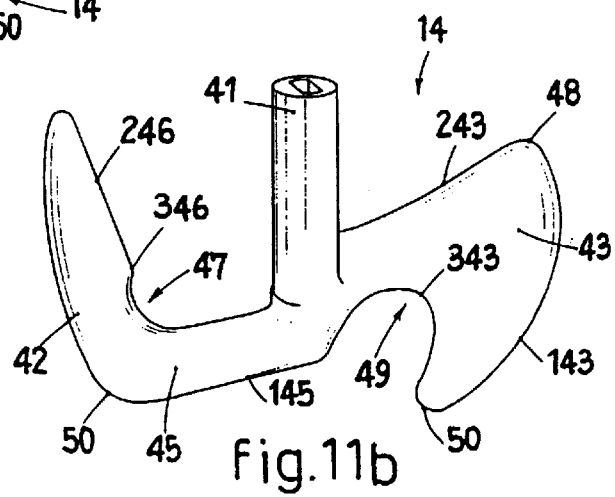

According to a preferential embodiment, the two blades 42 and 43 are made of at least partly flexible and elastically deformable material, for example non-toxic plastic. FIGS. 11a and 11b show an example of two preferential embodiments of the whisk 14 used in the apparatus 10 according to the invention.

The first blade 42 lies on an inclined plane, in relation to the direction of rotation of the whisk 14, at an angle of more than 90° with respect to the bottom 213 of the receptacle 13.

The first blade 42 is substantially L-shaped defined by a lower fin 45 with a substantially rectilinear base profile 145 arranged in contact with the bottom 213, and an upper fin 46, with a slightly curved outer profile 146 suitable to slide along the side wall 113.

The lower fin 45, in relation to the inclined arrangement of the first blade 42 with respect to the plane defined by the bottom 213 of the receptacle 13, causes a scraping action on the bottom 213 so as to remove all the parts of the ingredients of the ice-cream possibly attached thereto.

The upper fin 46 includes a protrusion 346 on the inner profile 246 and is axially twisted in its upper part.

In the embodiment shown in FIG. 11a, the protrusion 346 is pronounced, so as to form a sort of peak, the inner profile 246 falling away before and after the protrusion 346 so as not to create obstacles or impediments to the free flow of the ingredients as the ice-cream gradually becomes more creamy and compact.

In the embodiment shown in FIG. 11b, the protrusion 346 is in a lower position with respect to the position in FIG. 11a, and defines a hollow 47 which encourages the passage of the material scraped and raised by the advancing lower fin 45.

The second blade 43, which in relation to the direction of rotation of the whisk 14 lies on a plane inclined by an angle of less than 90° with respect to the bottom 213, is substantially pointed with a rounded top 48 and has a slightly convex inner surface with the convexity facing towards the bottom 213.

The second blade 43 has a first curved side 143 suitable to be arranged substantially in contact with the side wall 113, a second side 243 connected with the coupling element 41 and a curved inner side 343 facing the bottom 213 and defining a hollow 49 which, in the embodiment shown in FIG. 11b, is very accentuated so as to encourage the free passage of the material during the rotation of the whisk 14.

In the first blade 42, the base profile 145 of the lower fin 45 and the outer profile 146 of the upper fin 46 are connected by a curved segment 50, as in the second blade 43 the outer profile 143 and the curved profile 343 are connected by a similar curved segment 50.

The curved segments 50 make more efficient the contact of the whisk 14 with the zone of connection between the bottom 213 and the side wall 113 of the ice-cream making receptacle 13.

As the whisk 14 rotates, the two blades 42, 43 each carry out a specific action of mixing the ingredients, facilitating the creaming of the ice-cream and making it quicker.

The first blade 42, with the base profile 145 of the lower fin 45 and with the outer profile 146 of the upper fin 46, scrapes respectively the bottom 213 and the side wall 113 of the ice-cream making receptacle 13.

Due to the effect of the inclination of the lower fin 45 with respect to the plane define by the bottom 213, the ice-cream mixture scraped from the bottom 213 by the action of the profile 145 is removed and raised, sliding on the inner side 246 of the upper fin 46, particularly in correspondence with the hollow 47.

The mixture which is attached to the side wall 113, due to the inwardly twisted shape of the upper fin 46, is scraped from the said side wall 113 and conveyed towards the inside of the receptacle 13.

The second blade 43, because of its convex shape with the convexity facing towards the bottom 213, causes the mixture to be conveyed from the central zone downwards and towards the periphery of the receptacle 13, compressing the mixture onto the bottom 213 and the side wall 113.

In this way, the coldest part of the mixture, that is, the part which is in direct contact with the cooled walls of the receptacle 13, is mixed with the warmest part of the mixture, that is, the part in the inner zone of the receptacle 13, which is then in turn conveyed towards the bottom 213 and the side wall 113.

Therefore, the ice-cream mixture is mixed in an optimum manner and its consistency and temperature is homogenised.

Moreover the protrusion 346 on the upper fin 46 of the first blade 42 achieves a supplementary mixing of the mixture.

The bottom 213 and the side wall 113 of the receptacle 13 are continually scraped and cleaned, thus encouraging a cooling exchange between them and the ingredients of the ice-cream, and reducing processing times.

The action of lifting the mixture by the first blade 42, alternated with the compression exerted by the second blade 43 on the mixture, softens the mixture and improves the creaminess thereof.

The mixture, moreover, is creamed more easily and quickly due to the shape of the inner profile 343 of the second blade 43 which, in association with the bottom 213, defines the hollow 49 through which the mixture can emerge.

In fact, after it has been compressed by part of the second blade 43, the mixture can expand through the hollow 49, thus acquiring greater creaminess and softness.

In the embodiment shown in FIG. 11a, the lower fin 45 of the first blade 42 is arranged tangent to the coupling element 41, then connecting with the second blade 43.

This position of the lower fin 45 further encourages the mixing of the mixture as it emerges from the hollow 49 on the second blade 43.

What is claimed is:

1. Apparatus to produce ice-cream or similar cold product, comprising a substantially cylindrical shaped cooling container (12), cooling means (23) arranged around said cooling chamber (12) and a removable ice-cream making receptacle (13) which can be associated with the cooling chamber (12), the ice-cream making receptacle (13) including a bottom (213) and a vertical wall (113), inside the receptacle (13) there being included a rotating whisk (14) associated with a driven shaft (19) substantially coaxial to the receptacle (13), wherein said cooling means (23) comprise a vertial aperture (20) suitable to make them at least partly elastic, said cooling means (23) being able to selectively assume a first widened position, in which the ice-cream making receptacle (13) can be inserted into or removed from the cooling chamber (12), or a second closed position in which the ice-cream making receptacle (13) is retained inside the cooling chamber (12) by the cooling means (23), elastic means (30) being provided to normally keep said cooling means in said second position, and opening means (32) being provided to co-operate with the cooling means (23) to actuate them selectively from the second to the first positions, characterised in that said cooling means (23) comprise two opposite vertical fins (31) laterally delimiting said vertical aperture (20) and that said opening means (32) comprise at least a cam element (36) having a profile suitable to directly co-operate with said two opposite surface, said profile comprising two plane sides (36a) opposite each other and parallel therebetween, which are connected by two curved sides (36b), outwardly convex, also opposite to each other, the distance ($d_2$) between said curved sides (36b) being greater than the distance ($d_1$) between said plane sides (36a), wherein said cam element is normally positioned with said plane sides (36a) parallel to and in contact with said second position by said elastic means (30) and wherein said cam element is able to be rotated around its central shaft (34) to bring said curved sides (36b) in contact with said vertical fins (31) for enlarging said cooling means in said first position, against the action of said elastic means (30).

2. Apparatus as in claim 1, characterised in that said said central shaft (34) is directly formed by means of die-casting and is arranged substantially parallel to the vertical apertur (20), command means being connected to said shaft (34) to make it rotate by defined angles.

3. Apparatus as in claim 2, characterised in that the command means consist of a lever (35) radially associated with the rotatable shaft (34).

4. Apparatus as in claim 1, characterised in that the cooling means (23) comprise at least a substantially cylindrical cooling coil (23) and that the cooling chamber (12) comprises at least a substantially annular outer band (26), the coil (23) and the outer ban (26) being interrupted, in corresponding positions, by a desired segment to define the vertical aperture (20).

5. Apparatus as in claim 4, characterised in that the outer band (26) has the ends facing outwards to define said vertical fins (31).

6. Apparatus as in claim 5, characterised in that the shaft (34) comprises at least two cam elements (36) distance from each other to define a space (37) to partly house the elastic means (30).

7. Apparatus as in claim 6, characterised in that the shaft (34) comprises five cam elements (36) distanced from each other to define three spaces (37) each of which houses a respective elastic means (30) consisting of a helical spring.

8. Apparatus as in claim 4, characterised in that an annular element (25) made of heat insulating material is interposed between the coil (23) and the outer band (26).

9. Apparatus as in claim 8, characterised in that, in correspondence with the vertical aperture (20), the annular element (25) is equipped with a shaping (125) suitable to facilitate the movements to widen or restrict the vertical aperture (20).

10. Apparatus as in claim 1, characterised in that the whisk (14) comprises a first blade (42) and a second blade

(43) arranged on diametrically opposite sides with respect to a central element (41) suitable to couple with the shaft (19), the first blade (42) being substantially L-shaped and comprising a lower fin (45) with a substantially rectilinear base profile (145) co-operating with the bottom (213) and an upper fin (46) with a curved outer profile (146) co-operating with the side wall (113), the second blade (43) being shaped substantially like a point with a top (48) and being provided at the bottom with a curved profile (343) defining a hollow (49) through which the mixture to be whipped passes.

11. Apparatus as in claim 10, characterised in that the first blade (42) lies an a plane inclined, in relation to the direction of rotation of the whisk (14), by an angle of more than 90° with respect to the bottom (213).

12. Apparatus as in claim 10, characterised in that the second blade (43) lies on a plane inclined, in relation to the direction of rotation of the whisk (14), by an angle of less than 90° with respect to the bottom (213).

13. Apparatus as in claim 10, characterised in the upper fin (46) has an inner profile (246) comprising an intermediate protrusion (346) and is axially twisted in its upper part.

14. Apparatus as in claim 10, characterised in that the protrusion (346) defines at the lower part a hollow (47) through which the material raised by the advancing lower fin (45) can pass.

15. Apparatus as in claim 10, characterised in that the second blade (43) has a slightly convex inner surface with the convexity facing towards the bottom (213).

16. Apparatus as in claim 15, characterised in that the second blade (43) comprises a first curved side (143) suitable to be arranged substantially in contact with the side wall (113), a second side (243) connected to the coupling element (41) and a curved inner side (343) through which the material pass.

17. Apparatus as in claim 10, characterised in that the two blade (42, 43) are made of at least partly flexible material.

18. Apparatus as in claim 10, characterised in that the two blades (42, 43) are made as a single piece with the coupling element (41).

* * * * *